United States Patent
Lippert et al.

(10) Patent No.: US 6,651,611 B2
(45) Date of Patent: Nov. 25, 2003

(54) COMBUSTION CHAMBER FOR SWIRL FLOW TWO VALVE SPARK IGNITION DIRECT INJECTION ENGINE

(75) Inventors: Andreas M. Lippert, Rochester Hills, MI (US); Alexandros C. Alkidas, Troy, MI (US); Ko-Jen Wu, Troy, MI (US); William Robert Matthes, Troy, MI (US); Jennifer L. Liedtke, Rochester, MI (US); David L. Reuss, Huntington Woods, MI (US); Alan William Hayman, Romeo, MI (US); Gerald J. Schimelfening, Sterling Heights, MI (US); Gerald A. Silvas, Marysville, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/132,390

(22) Filed: Apr. 25, 2002

(65) Prior Publication Data

US 2003/0200953 A1 Oct. 30, 2003

(51) Int. Cl.$^7$ .......................... F02B 17/00; F02B 23/08
(52) U.S. Cl. ...................... 123/295; 123/301; 123/305; 123/306; 123/661
(58) Field of Search ............................. 123/193.6, 276, 123/279, 295, 301, 305, 306, 661

(56) References Cited

U.S. PATENT DOCUMENTS

| | | | | |
|---|---|---|---|---|
| 4,344,408 A | * | 8/1982 | Inoue et al. | 123/661 |
| 4,480,625 A | * | 11/1984 | Kanda et al. | 123/661 |
| 4,565,181 A | * | 1/1986 | August | 123/661 |
| 4,759,323 A | * | 7/1988 | August | 123/661 X |
| 6,035,822 A | * | 3/2000 | Suzuki et al. | 123/276 |
| 6,116,211 A | * | 9/2000 | Suzuki et al. | 123/305 |
| 6,494,178 B1 | * | 12/2002 | Cleary et al. | 123/276 |

* cited by examiner

Primary Examiner—Tony M. Argenbright
(74) Attorney, Agent, or Firm—Kathryn A. Marra

(57) ABSTRACT

A combustion chamber for a swirl flow two valve spark ignition direct injection engine includes a cylinder with a closed end having a wedge shaped combustion chamber recess. A fuel injector extends through the closed end near a shallow side of the wedge recess. A spark plug extends through the closed end at a deeper part of the wedge recess opposite from the injector. A single pair of laterally spaced intake and exhaust valves control intake and exhaust ports opening into the wedge recess. A piston in the cylinder has an outer diameter and includes a head end having a raised pedestal with a shallow upwardly angled face ending at a raised ridge and enclosing a shallow bowl in the head end. The bowl is generally oval with a major dimension generally aligned with a cylinder centerline through the valves.

13 Claims, 3 Drawing Sheets

COMBUSTION CHAMBER FOR SWIRL FLOW TWO VALVE SPARK IGNITION DIRECT INJECTION ENGINE

TECHNICAL FIELD

This invention relates to stratified charge engines and more particularly to a combustion chamber for swirl flow two valve spark ignition direct injection (SIDI) engines.

BACKGROUND OF THE INVENTION

Spark ignition direct injection (SIDI) combustion systems for internal combustion engines have been proposed to improve fuel economy when compared with more typical port fuel-injected combustion systems. The spark ignition direct injection engine is provided with a high pressure fuel injection system that sprays fuel directly into the engine combustion chamber, which is formed at least partially in the piston. The fuel is directed or transported to a specific region within the combustion chamber. This creates a stratified charge in the combustion chamber resulting in fuel economy benefits, since the throttling requirements are less restrictive and the fuel combustion characteristics are improved. Development of such engines has been primarily directed to engines having dual intake valves adapted for creating cylinder air swirl for stratified charge operation in a lower power range and for maximizing intake air flow for increased power in a higher power range. Conventional high pressure fuel injectors may be used in such engines.

U.S. patent application Ser. No. 09/930,707 filed Aug. 13, 2001 and assigned to the assignee of the present invention, discloses an improved combustion chamber for a SIDI engine having four valves per cylinder. The piston includes an oblong or oval shaped bowl, forming 50% to 70% of the total combustion chamber volume at piston top center, into which a fuel spray is injected during the piston compression stroke. Development is desired of a practical combustion chamber for a stratified charge engine having only two valves per cylinder, including a single intake valve and a single exhaust valve.

SUMMARY OF THE INVENTION

The present invention provides a combustion chamber and piston bowl design for a spark ignition direct injection (SIDI) engine having two valves per cylinder.

The combustion chamber is defined by a cylinder having a closed end including a wedge shaped combustion chamber recess. A fuel injector extends through the closed end near a shallow side of the wedge recess and a spark plug extends through the closed end at a deeper part of the wedge recess opposite from the injector. A single pair of laterally spaced intake and exhaust valves control intake and exhaust ports opening into the wedge recess generally between the injector and the spark plug.

The combustion chamber is further defined by a piston in the cylinder, the piston having an outer diameter and a head end facing the end of the cylinder. The head end includes a raised pedestal with a shallow upwardly angled face ending at a raised ridge and enclosing a shallow bowl in the head end. The bowl is generally oval with a major dimension generally aligned with a cylinder centerline through the valves.

The intake port is configured to generate a swirling flow of intake air in the cylinder during the piston intake stroke. The injector is aligned to inject a spray of fuel into the piston bowl during the piston compression stroke so that the fuel and air form in the bowl a swirling flow of stratified locally rich mixture that is compressed and directed by the piston ridge to the spark plug for ignition of the stratified air fuel charge near the end of the compression stroke. Preferably the fuel spray is angled to one side toward the direction of air swirl in the bowl as well as downward toward the bowl.

These design features are utilized to create a cloud of flammable fuel-air mixture and move it toward the spark plug at an ignition timing that results in high engine efficiency. Efficiency is obtained by operating the engine unthrottled at part loads, where load control is obtained by overall lean operation (approximately 45/1 air fuel ratio) and high dilution (approximately 35%) with residuals and exhaust gas recirculation.

These and other features and advantages of the invention will be more fully understood from the following description of certain specific embodiments of the invention taken together with the accompanying drawings.

DESCRIPTION OF THE PREFERRED EMBODIMENT

Figure 1:
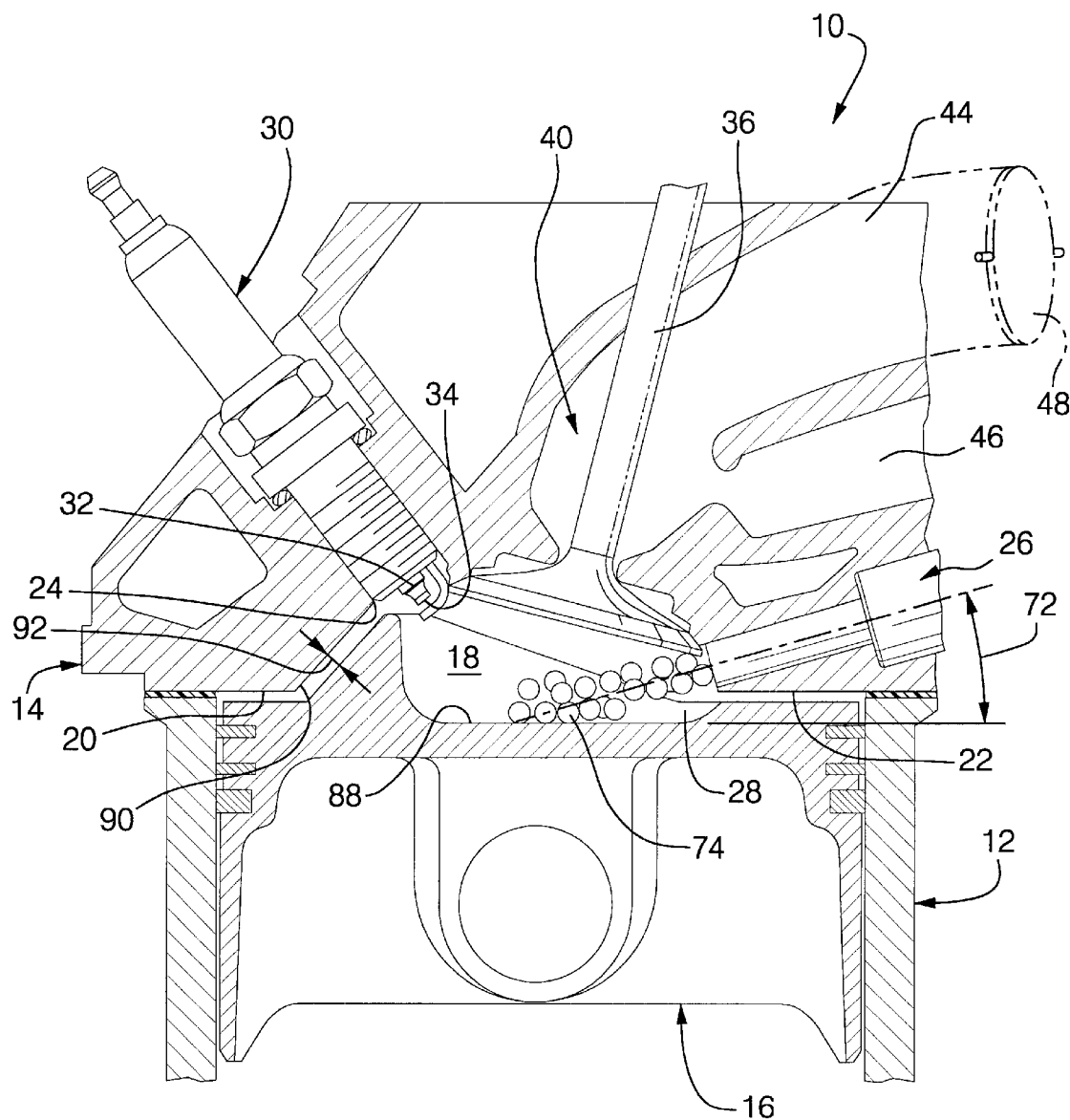
FIG. 1 is a cross-sectional view through the cylinder head, piston and combustion chamber of a cylinder of an engine formed according to the invention.

Referring first to FIG. 1 of the drawings in detail, numeral 10 generally indicates a swirl flow two valve spark ignition direct injection (SIDI) engine. Engine 10 includes a cylinder 12 closed at an upper end by a cylinder head 14. A piston 16 is reciprocably mounted in the cylinder and defines with the closed end of the cylinder a combustion chamber 18.

At the cylinder closed end, the cylinder head 14 includes generally flat inner and outer surfaces 20, 22 separated by a generally wedge shaped combustion chamber recess 24. A fuel injector 26 is mounted in the cylinder head and extends through the closed end of the cylinder near a shallow side 28 of the wedge recess 24. A spark plug 30 is mounted in the cylinder head and extends through the closed end of the cylinder. Spark plug 30 includes an electrode 32 with an outer end or tip 34, defining a spark gap, protruding into the combustion chamber 18 at a deeper part of the wedge recess opposite from the injector 26. A single pair of laterally spaced intake and exhaust valves 36, 38 (FIG. 2) are mounted in the cylinder head and control respectively intake and exhaust ports 40, 42 which open into the wedge recess, generally between the injector 26 and the spark plug 30.

Upstream of the combustion chamber end, the intake port 40 is divided into upper and lower portions 44, 46. The upper portion 44 of the port is controlled by a control valve 48 which may be adjusted to control or cut off air flow through the upper portion as desired during operation of the engine.

Figure 3:
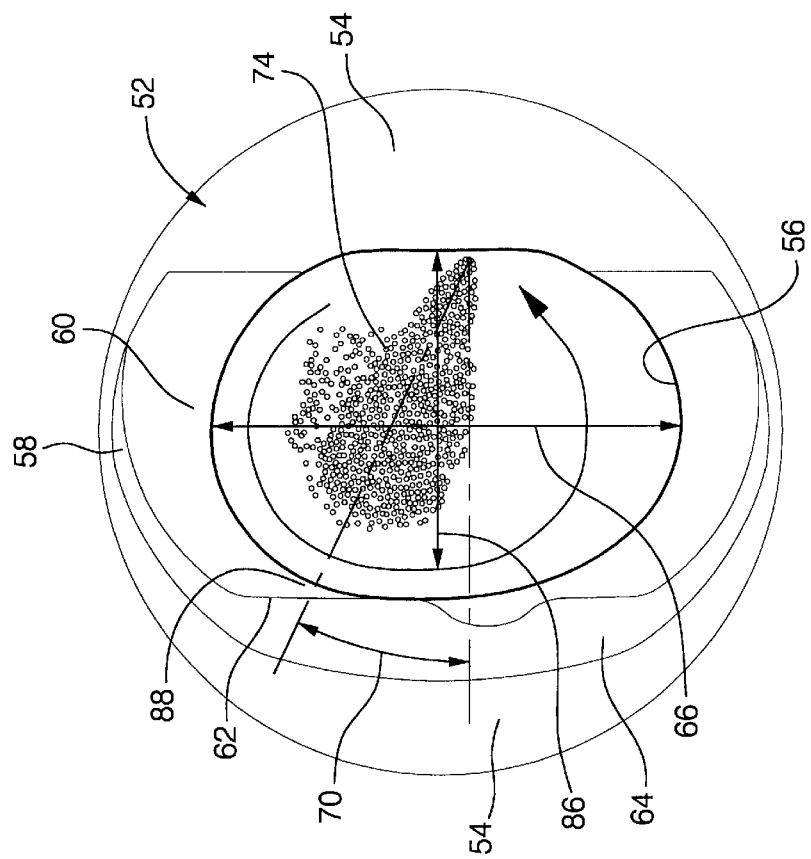
FIG. 3 is a top view of the piston portion of the combustion chamber of FIG. 2.
Figure 4:
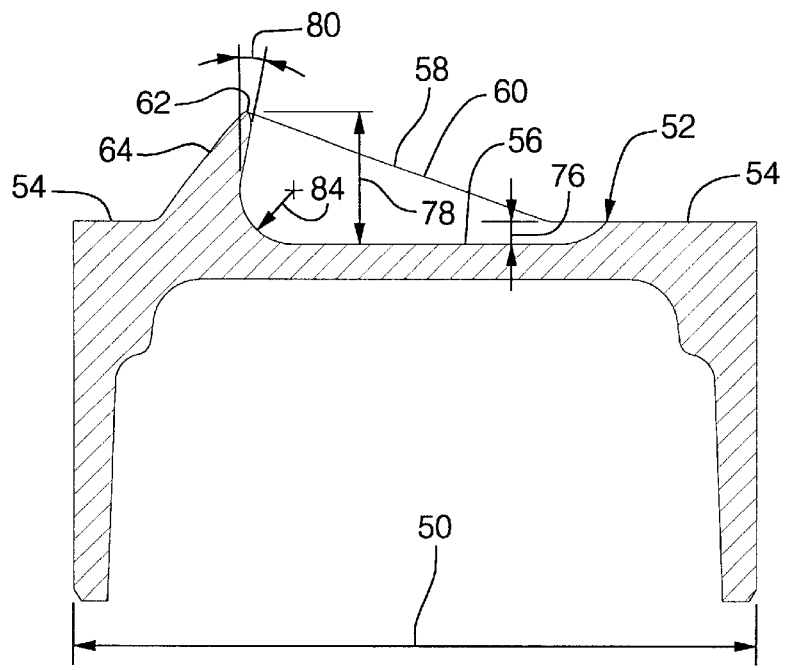
FIG. 4 is a partial cross-sectional view of the piston as shown in FIG. 1 with dimensional features indicated.

The piston 16, illustrated in FIGS. 1, 3, and 4, includes an outer diameter 50 which is essentially equal to the bore diameter of the cylinder 12. The piston further includes a head end 52 which has a generally flat surface 54 surrounding a shallow bowl 56 recessed below the surface 54. The bowl is partially contained within a raised pedestal 58 having a shallow upwardly angled face 60 ending at a raised ridge 62. The back side 64 of the ridge 62 is angled sharply downward to the flat surface 54. The bowl 56 is generally oval having a major dimension 66 generally aligned with a cylinder centerline 68 through the intake and exhaust valves 36, 38.

Figure 5:
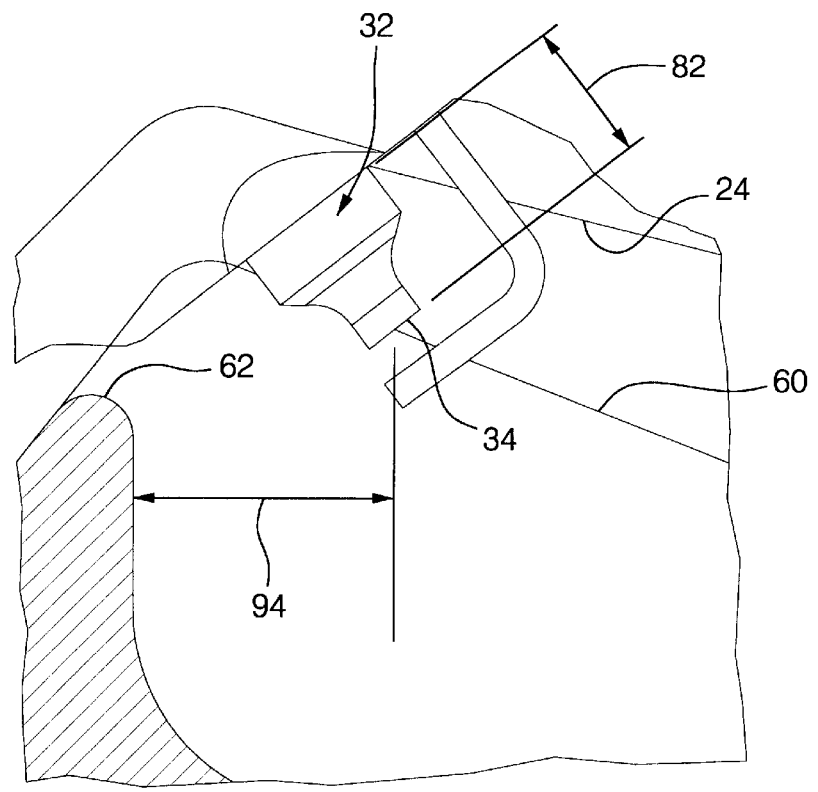
FIG. 5 is an enlarged cross-sectional view indicating the distance between the piston ridge and the spark plug in the combustion chamber.

Important design parameters of the combustion chamber and piston, as illustrated in FIGS. 1, 4, and 5, include the combustion chamber geometry, piston geometry, in-cylinder swirl flow (rotation about the cylinder axis), injector targeting, injector timing, and spark plug electrode position. These design parameters are utilized to create a cloud of flammable fuel air mixture and move it toward the spark plug at an ignition timing that results in high engine efficiency. Efficiency is obtained by operating the engine unthrottled at part load, where load control is obtained by overall lean operation (approximately 45/1 air fuel ratio) and high dilution (approximately 35%) with residuals and exhaust gas recirculation.

Figure 2:
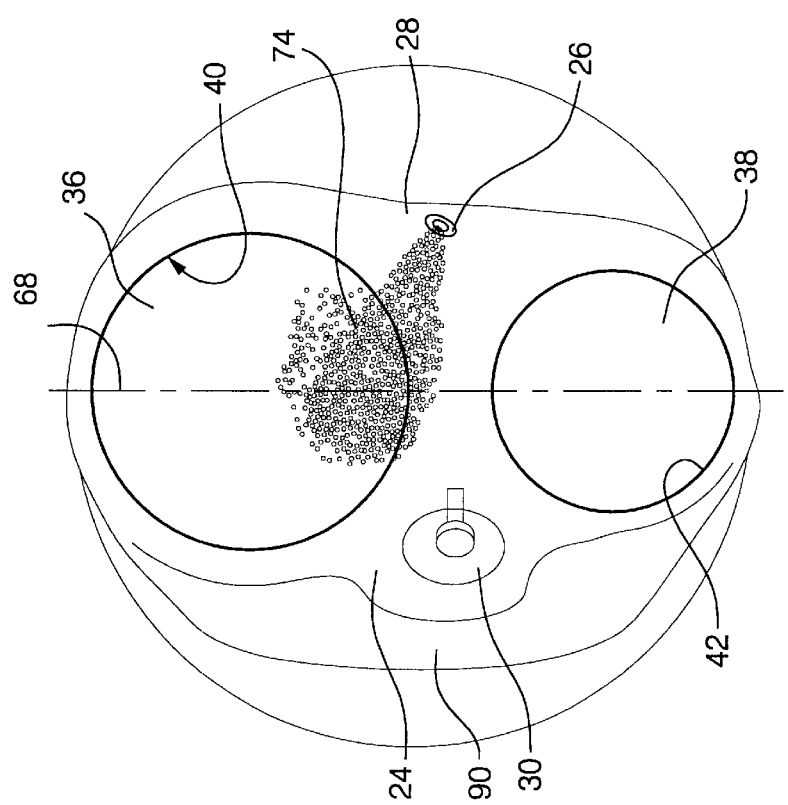
FIG. 2 is a view showing interior features of the cylinder head combustion chamber recess as viewed from the top looking downward through the cylinder head toward the piston.

The fuel spray from the injector 26 is targeted at a sideward angle 70 (FIG. 3) in a range of about 12–21° toward the intake valve 36 side of the piston bowl as shown in FIGS. 2 and 3 and also at a downward angle 72 (FIG. 1) in a range of about 25–35° toward the piston bowl. The liquid fuel spray 74 may impact the piston bowl 56 although the intent is to minimize the wall wetting. The liquid spray has a cone angle, as defined conventionally, in the range of about 65–80°. The spark and injection timing are adjusted to create a properly mixed fuel cloud at the spark plug to phase the heat release for maximum efficiency and minimum regulated emissions. The end of injection timing for stratified operation ranges from about 35° to 50° before top dead center (BTDC).

The piston bowl geometry is designed to capture the liquid fuel spray and fuel vapor, control the fuel and air mixing and direct the fuel air mixture toward the spark plug. Bowl geometry parameters include the generally oval shape of the bowl outline, the bowl depth 76 (FIG. 4) below the flat surface 54, the ridge height 78, the ridge wall re-entrant angle 80, the distance 94 from the ridge 62 to the tip 34 of the spark plug (FIG. 5), and the radius of curvature 84 (FIG. 4) between the bowl floor and the ridge wall.

The piston bowl 56 is generally oval in shape, with an ovality ratio of major dimension 66 to minor dimension 86 in a range of approximately 5/4 to 6/4. However the oval shape is bulged slightly outwards at the location of the piston ridge where the fuel spray and vapor impact at 88. The bowl volume, including the volume of the bowl plus the clearance space above the bowl, has a range of approximately 60 to 70% of the total enclosed combustion chamber volume at piston top dead center as shown in FIG. 1.

In an exemplary embodiment, the piston outer diameter is approximately 96 millimeters. The bowl depth 76 falls within a range of 1–6 millimeters. The ridge height 78 falls within a range of 13–19 millimeters. The re-entrant angle 80 of the ridge wall ranges between 0 and 12°. The spark plug electrode 32 protrudes a distance 82 of about 6–9 mm into the combustion chamber 18. The radius of curvature 84 between the bowl floor and the ridge wall has an optimal range of between 6 and 10 millimeters.

The back wall 90 of the combustion chamber is configured with a steep upward angle to maintain high flow through the valves, minimize the mass of the piston ridge 62 and create a desired squish flow between the back 64 of the piston ridge and the back wall 90 of the combustion chamber. The squish height 92 at top dead center ranges between 2.5 and 3.5 millimeters.

The spark plug 30 is positioned with a distance 94 of from 7 to 10 millimeters between the inner side of the piston ridge 62 and the tip 34 of the spark plug.

In operation, swirl of the intake air drawn into the cylinder is directed by the intake port to be counterclockwise as viewed looking downward into the piston bowl. The amount of swirl is varied from essentially no or little swirl when both upper and lower portions of the intake port 44 are open to intake air flow. Swirl is increased by controllably blocking off flow through the upper portion 44 of the intake port by controlling the port control valve 48. When the valve is at least partially closed, in the part load range during stratified charge operation, the swirl reaches a fluid rotational speed relative to engine speed of between 2.5 and 4.5. The amount of swirl is used to control both the spray mixing and the time of arrival of the fuel air cloud at the spark plug.

While the dimensional ranges indicated above were developed for a piston outer diameter of about 96 millimeters, it is expected that these ranges may be applied to engines with piston/cylinder diameters in a reasonable range, such as 86–106 millimeters, with equivalent results. While further extension of the ranges may be possible, testing to confirm the results may be required.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A combustion chamber for a swirl flow two valve spark ignition direct injection engine, said combustion chamber comprising:

a cylinder having a closed end including a wedge shaped combustion chamber recess, a fuel injector extending through the closed end near a shallow side of the wedge recess, a spark plug extending through the closed end at a deeper part of the wedge recess opposite from the injector, and, a single pair of laterally spaced intake and exhaust valves controlling intake and exhaust ports opening into the wedge recess generally between the injector and the spark plug; and a piston having an outer diameter and a head end having a raised pedestal with a shallow upwardly angled face ending at a raised ridge and enclosing a shallow bowl in the head end; the bowl being generally oval with a major dimension generally aligned with a cylinder centerline through the valves.

2. A combustion chamber as in claim 1 wherein the piston bowl has a volume ratio of the bowl volume plus the clearance above the bowl of about 60% to 70% of the total enclosed volume of the combustion chamber at piston top dead center.

3. A combustion chamber as in claim 1 wherein the intake port is divided with a control valve in one portion controllable to generate a variable swirling flow of intake air in the cylinder during the piston intake stroke and the injector is aligned to inject a spray of fuel into the piston bowl during the piston compression stroke whereby, with the control valve at least partially closed, the fuel and air form a swirling flow of stratified locally rich mixture in the bowl that is compressed and directed to the spark plug for ignition of the stratified fuel charge near the end of the compression stroke.

4. A combustion chamber as in claim 3 wherein when the control valve is at least partially closed, the swirl ratio of fuel mixture rotation in the bowl relative to engine speed is in a range of about 2.5–4.5.

5. A combustion chamber as in claim 4 wherein the fuel spray is angled downward toward the piston and sideward toward the direction of air swirl in the bowl.

6. A combustion chamber as in claim 5 wherein the piston bowl includes a floor joined to a ridge inner wall by a radius of curvature in a range of about 6 to 10 millimeters.

7. A combustion chamber as in claim 5 wherein the ridge inner wall has a re-entrant angle in a range of about 0 to minus 12 degrees.

8. A combustion chamber as in claim 5 wherein the piston bowl has an ovality in a range of about 5/4 to 6/4 as defined by the ratio of a major dimension to a minor dimension of the bowl.

9. A combustion chamber as in claim 8 wherein the minimum depth of the piston bowl is in a range of about 1 to 6 millimeters.

10. A combustion chamber as in claim 9 wherein the piston ridge height is in a range of about 13–19 millimeters.

11. A combustion chamber as in claim 5 wherein a back side of the piston ridge opposes a back wall of the combustion chamber separated by a squish height at piston top dead center in the range of about 2.5 to 3.5 millimeters.

12. A combustion chamber as in claim 5 wherein the spark plug has an electrode that extends into the combustion chamber a distance in the range of about 6 to 9 millimeters.

13. A combustion chamber as in claim 12 wherein the distance from the piston ridge to the tip of the electrode is in the range of 7–10 millimeters.

* * * * *